United States Patent Office 3,546,050
Patented Dec. 8, 1970

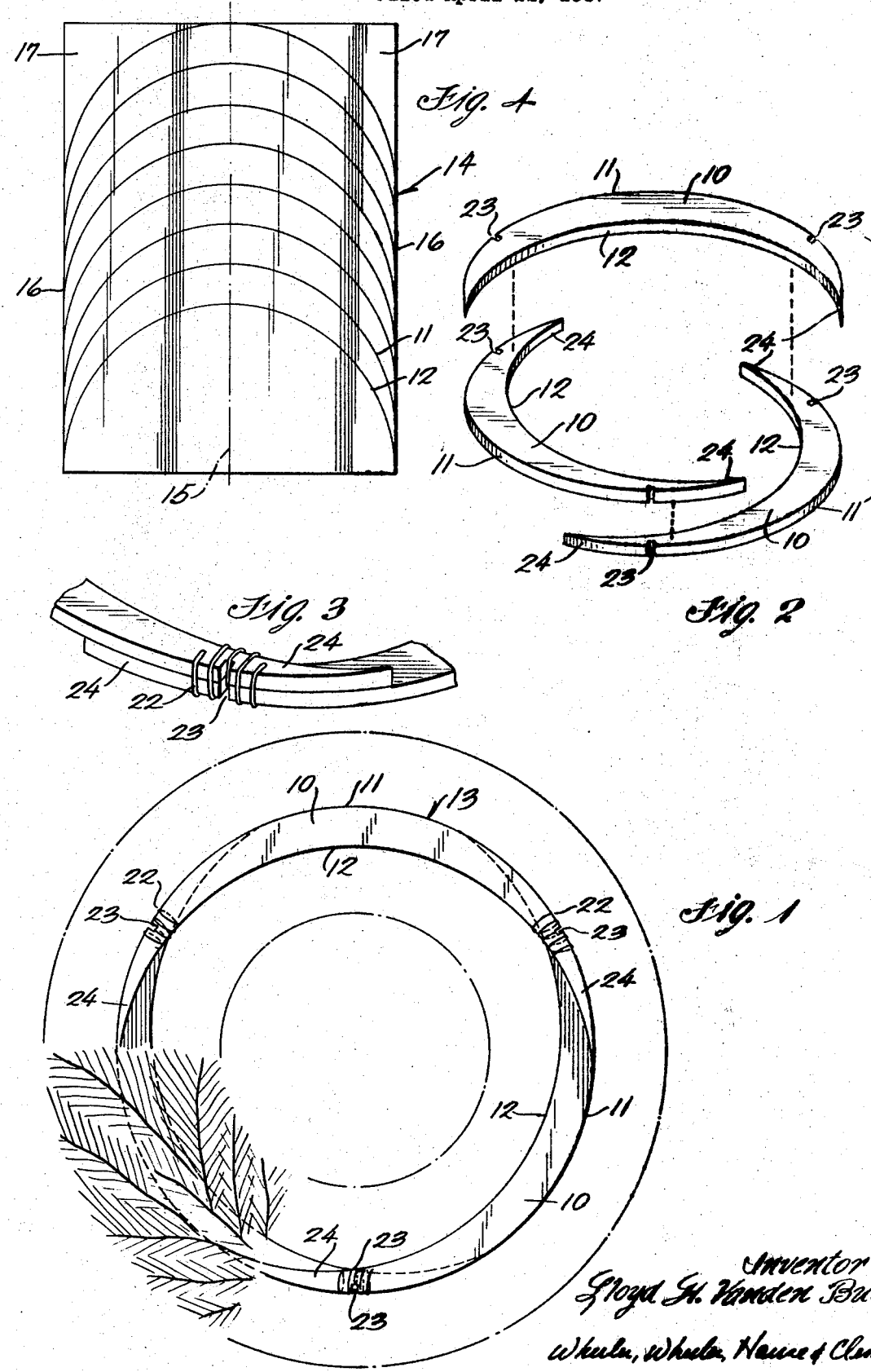

3,546,050
WREATH RING
Lloyd H. Vanden Bush, 2525 N. 58th St.,
Milwaukee, Wis. 53210
Filed Apr. 21, 1967, Ser. No. 632,684
Int. Cl. A47q 33/08
U.S. Cl. 161—15     5 Claims

ABSTRACT OF THE DISCLOSURE

Disclosed herein is a frame or ring for a floral or evergreen wreath, the frame comprising an assembly of at least three crescent shaped flat segments cut from hardboard or the like. The segments when assembled to form an annular ring have overlapping ends which are secured together. The crescent shaped segments may have end uses other than as component parts of a wreath ring.

BACKGROUND OF INVENTION

Christmas and floral wreaths are now fabricated on wire rings. A very large wreath, such as 4 feet in diameter, might be assembled on a hula loop. One of the troubles with these is that the floral material tends to turn on the ring. Moreover, in the larger sizes, the ring has to be reinforced in order to support the weight of the floral material.

SUMMARY OF INVENTION

In an important embodiment the invention provides an annular frame for a floral or evergreen bough wreath or the like. The frame is made up of an assembly of a plurality of crescent shaped segments. When assembled the ends of the segments overlap facilitating the securing of the segments together to form a ring or annular frame. The segments are flat. Accordingly, floral or evergreen displays will be held against turning on the frame.

Each of the crescent shaped segments has a circular convex outer edge and a circular concave inner edge which are equal in length and have the same radius of curvature. The length of the edges is equal to one-half of the circumference of a circle having a radius equal to the radius of curvature of the edges. The assembly of segments forms a ring or annulus having an outside circumference approximately twice the length of the edge of each segment.

The utilization of crescent shaped segments having the geometric relationships of the present invention facilitates fabrication of the segments from a single sheet of hardboard or plywood with a minimum amount of waste. This effectuates substantial economy of construction as compared with punching or cutting a one-piece ring from a sheet.

DRAWINGS

FIG. 1 is a plan view of the wreath frame assembly in accordance with the invention.

FIG. 2 is an exploded vew of the segment assembly.

FIG. 3 is a fragmentary perspective view of the assembled frame.

FIG. 4 is a rectangular sheet of hardboard with the segment edge lines inscribed on the hardboard.

DESCRIPTION OF THE PREFERRED EMBODIMENT

In the drawings, FIG. 2 shows three crescent shaped segments 10 with each segment having an outer convex edge 11 and an inner concave edge 12. The segments when assembled form a ring or annular shaped frame 13. Each segment 10 has an arcuate extent of 180°

The edges 11 and 12 are equal in length and have the same radius of curvature. The length of each of the edges 11 and 12 is also equal in length to one-half the circumference of a circle having the same radius. Inasmuch as the segments 10 each have an equal radius of curvature on their outer edges 11, the frame assembly has a circular perimeter with every point on the perimeter being equidistant from a common center.

The segments 10 are desirably formed from a rectangular sheet of plywood or hardboard 14 as shown in FIG. 4. The lines for edges 11 and 12 are laid out by inscribing successive 180° arcs on the hardboard 14 using a compass or the like. The centers of the arcs are located on a center line 15—15 which is equidistant from the longitudinal edges 16 of the hardboard 14. The radius of the arcs is equal to the distance between the edge 16 and the center line 15—15 or one-half the width of the board 14. The centers of the arcs are measured off in equal distances along line 15—15.

The segments are then punched, die cut or sawed from the hardboard along the inscribed edge lines. The only waste remaining is the upper corners 17 and the lower area 18 enclosed by the first arc line. Utilizing frame segments having a geometry in accordance with the invention affords maximum use of material with a minimum amount of scrap thus providing substantial economy of construction.

Branches or boughs of evergreen trees can be easily secured to the assembled frame or ring as shown in FIG. 1. Inasmuch as the segments 10 are flat, the evergreen boughs or other floral material will not turn on the frame.

The segments 10 may be secured in an assembly by any fastener, for example, a cord or a wire 22. Accurate initial alignment of the three segments is facilitated by notches 23 in the overlapping end portions 24 of the segments. Moreover, interlocking of the wire 22 in the registering notches precludes subsequent slippage of the segments in the assembly.

FIG. 4 also illustrates a novel method for the aconomical fabrication of crescent shaped segments regardless of the end use thereof. Arch or bow shape segments are useful for many purposes, for example, as trellis segments, floral boarders, plant supports, supports for plant covers, etc. These can be made in quantity, in any desired size (for example up to 4 feet in diameter) in the manner illustrated in FIG. 4 with little waste.

Wreath rings embodying the invention can be made of any typical size. Economy of fabrication is particularly evident in the large sizes (for example—4 feet in diameter). The frame is inherently strong and no reinforcement is needed.

The sheet 14 from which the segments are formed will vary in size and thickness depending on the end use for the segments. For small wreath rings (for example— one foot in diameter) sheet 14 may be ⅛" thick, one foot wide and eight feet long. For a large wreath ring (for example—four feet in diameter) the sheet may be ¼" thick, four feet wide and eight feet long. In any size great saving in cost and economy of fabrication are achieved.

I claim:

1. An annular frame comprising an assembly of crescent shaped segments with each of said segments having an outer convex edge and an inner concave edge, said outer and inner edges having an equal radius of curvature, and said edges intersecting at the ends of each of said segments, and means for securing said segments together to form a ring.

2. A frame in accordance with claim 1 wherein there are three crescent shaped segments.

3. A frame in accordance with claim 1 in which every point on the perimeter of said assembly is substantially equidistant from a common center.

4. The frame of claim 1 in which the segments are flat.

5. A frame in accordance with claim 1 wherein said means for securing said overlapping end portions includes notches in said end portions.

References Cited

UNITED STATES PATENTS

| 1,482,537 | 2/1924 | Alter et al. | 161—15 |
| 1,518,618 | 12/1924 | Waters | 161—15 |
| 2,549,006 | 4/1951 | Propst | 161—31 |
| 3,110,647 | 11/1963 | Tong | 161—31 |

JOHN T. GOOLKASIAN, Primary Examiner

H. F. EPSTEIN, Assistant Examiner

U.S. Cl. X.R.

47—41.12; 161—31